June 20, 1950  A. S. BLANKENSHIP ET AL  2,512,411
NUT SHELLING MACHINE HAVING COOPERATING
ROTARY CRACKING MEMBERS
Filed June 7, 1945  3 Sheets-Sheet 1

A. S. Blankenship
F. F. Blankenship
INVENTOR.

BY *Knowles*
ATTORNEYS.

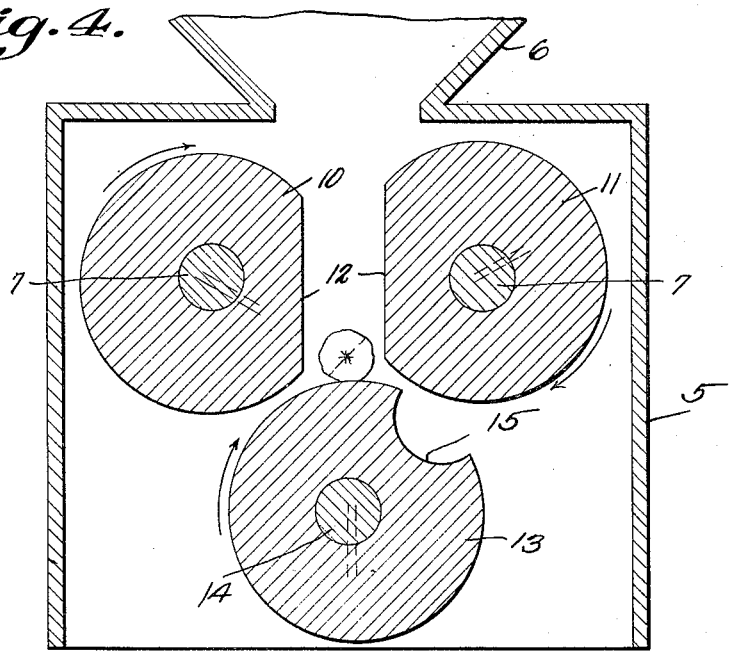
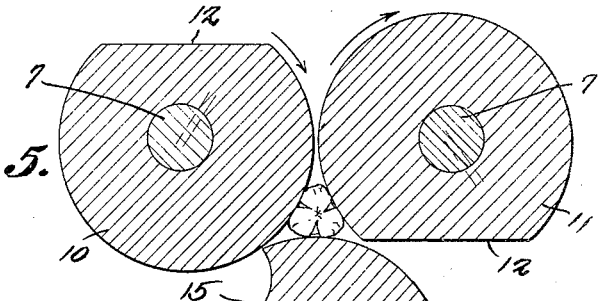
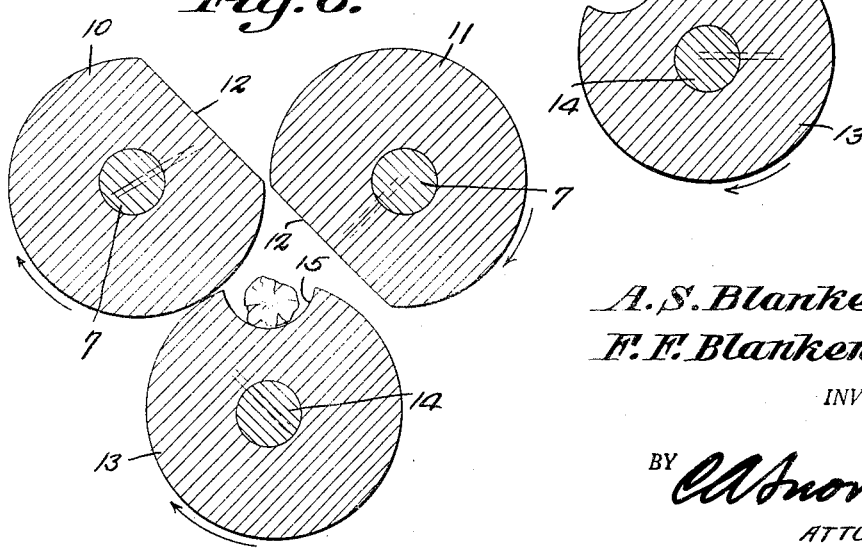

June 20, 1950     A. S. BLANKENSHIP ET AL     2,512,411
NUT SHELLING MACHINE HAVING COOPERATING
ROTARY CRACKING MEMBERS Filed June 7, 1945     3 Sheets-Sheet 3

A. S. Blankenship
F. F. Blankenship
INVENTORS.

BY *Knowles*
ATTORNEYS.

Patented June 20, 1950

2,512,411

UNITED STATES PATENT OFFICE 2,512,411

NUT SHELLING MACHINE HAVING CO-OPERATING ROTARY CRACKING MEMBERS

Albert S. Blankenship, Commerce, Tex., and
Forrest F. Blankenship, Norman, Okla.

Application June 7, 1945, Serial No. 598,028

3 Claims. (Cl. 146—11)

This invention relates to nut cracking machines, the primary object of the invention being to provide a machine embodying cracking members and an anvil so constructed and synchronized that nuts to be cracked and shelled, will be passed therebetween, and a three-way pressure directed to each nut, to the end that the nuts will be cracked at three points, without being crushed.

Another object of the invention is to provide cracking members which will operate to crack the shells of nuts, leaving the meats of the nuts shelled.

Still another object of the invention is to provide a housing in which the cracking members and anvil operate, and a hopper designed to feed nuts into the housing to be cracked between the cracking members.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 4 is a sectional view taken on line 4—4 of Fig. 1.

Figure 5 is a view illustrating the position of the cracking members and anvil during the cracking operation.

Figure 6 is a view illustrating the position of the cracking members and anvil after the cracking operation, the cracked nut resting in the concaved portion of the anvil.

Figure 1:
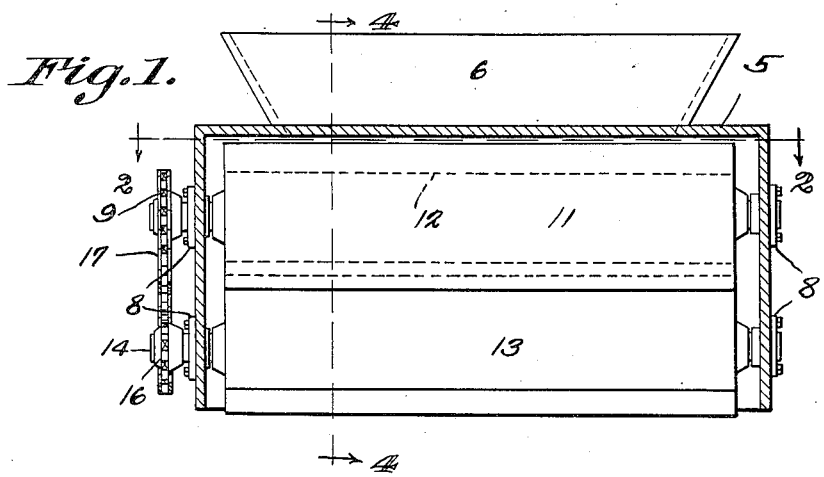
Figure 1 is a longitudinal sectional view through a nut cracking machine, constructed in accordance with the invention.
Figure 2:
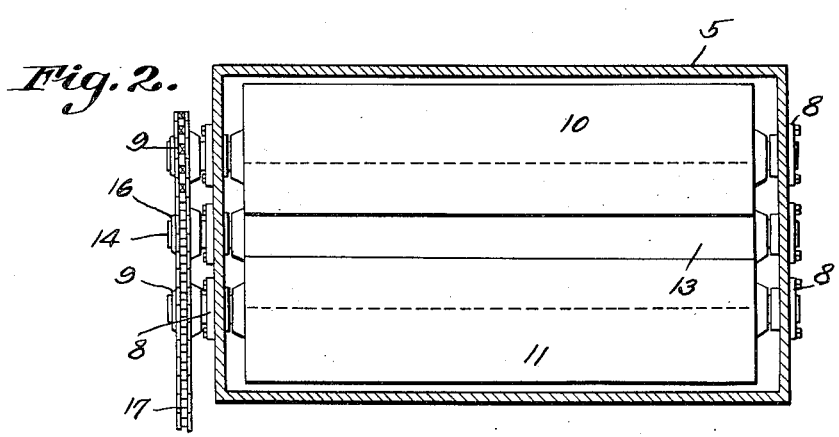
Figure 2 is a sectional view taken on line 2—2 of Fig. 1.
Figure 3:
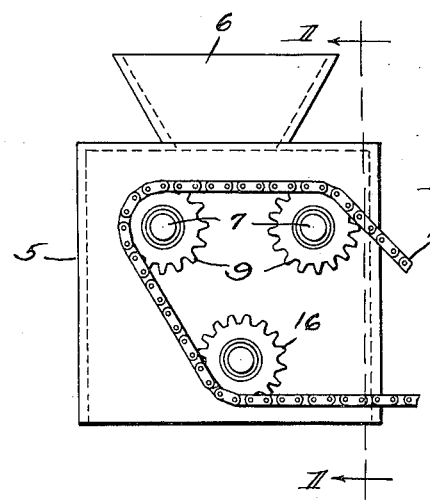
Figure 3 is an end elevational view of the machine.

Referring to the drawings in detail, the body portion which is indicated by the reference character 5, is in the form of a housing provided with a hopper 6 through which the nuts being cracked, are fed to the cracking members of the machine.

Disposed within the body portion, are spaced upper shafts 7 that are disposed in parallel spaced relation with respect to each other. These shafts 7 extend through the end walls of the body portion, where they operate in the bearings 8. Sprockets 9 are mounted on the ends of the shafts 7 which extend through one wall of the housing. Eccentrically mounted on the shafts 7 to move therewith, are cracking members 10 and 11, the cracking members being formed with chord portions removed 12 that extend throughout the entire length of the cracking members. Directly under the cracking members 10 and 11, is an anvil 13 which is eccentrically mounted on the shaft 14, to rotate therewith, the anvil 13 being provided with a concave portion formed throughout the length thereof, the concave portion being indicated by the reference character 15. This shaft 14 is also mounted in bearings fitted in openings in the end walls of the body portion 5, one end of the shaft 14 being extended beyond the end wall, where it supports the sprocket 16 which is secured to the shaft.

An operating chain 17 moves over the sprockets 9 and 16 to the end that the cracking members are rotated in a clockwise direction, to accomplish the purpose of the invention.

Figure 7:
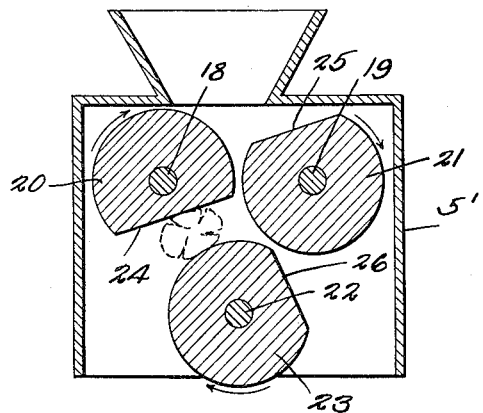
Figure 7 is a vertical sectional view through a modified form of machine wherein each cracking member is formed with a chord portion removed.

In the form of the invention as illustrated by Fig. 7 of the drawings, the housing or body portion is indicated by the reference character 5′, and the shafts 18 and 19 are mounted in bearings supported in the end walls of the housing or body portion. These shafts 18 and 19 support the cracking members 20 and 21 respectively, which are secured to the shaft, to rotate therewith.

Directly below the cracking members 20 and 21, is a shaft 22 which is also supported in bearings formed in the end walls of the body portion, the shaft 22 providing a support for the lower cylinder 23 which is secured thereto.

These shafts are also provided with sprockets over which a chain operates to rotate the cylinders in the direction of the arrows as indicated in Fig. 7 of the drawings.

Figure 8:
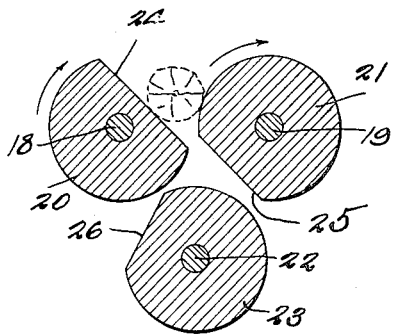
Figure 8 is a view indicating the relation of the cracking members during the cracking of a nut therebetween.
Figure 9:
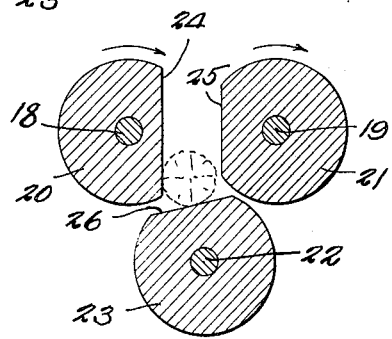
Figure 9 is a sectional view illustrating the cracking members and their positions with respect to each other, after the cracking of a nut therebetween.
Figure 10:
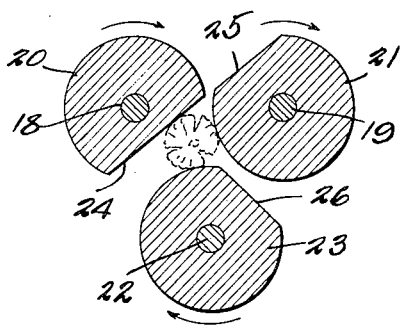
Figure 10 is a view illustrating the positions of the cracking members, when the cracked nut is being released from the cracking members.

The cylinder 20 is provided with a flat portion 24 extending throughout the length thereof, while the cylinder 21 is provided with a flat portion 25. The flat portion 25 is slightly narrower than the flat portion 24, and the flattened portion 26 of the cylinder 23 is slightly narrower than the flattened portion 25 of the cylinder 21. When a nut moves into the body portion of the device, the cracking members are in the positions as shown by Fig. 8 of the drawings. As the cylinders rotate to the positions shown by Fig. 9 of the drawings, the nut will drop through the space formed by the flattened portions of the cracking members 20 and 21 registering, as shown by Fig. 9. The nut drops onto the flattened surface of the anvil 23, whereupon further rotary movement of the cracking members will cause the enlarged portions of the cracking members to crack the nut therebetween, the nut falling from the cracking members in a manner as shown by Fig. 7 of the drawings.

Due to the construction shown and described, it has been found that nuts which are fed into the body portion through the hopper of the machine, will be cracked and the shells removed without crushing the meat of the nut.

From the foregoing it will be seen that I have provided eccentrically mounted rotary cracking members and an anvil constructed and synchronized in such a way that objects to be cracked or shelled are subjected to a three way pressure when the enlarged surfaces of the cracking members move to grip the object therebetween, said cracking members and anvil adapted to then move to release the cracked object.

What is claimed is:

1. In a nut shelling machine, a housing having a feed opening, a pair of horizontal parallel shafts mounted within the housing, cracking members secured to the shafts, said cracking members having chord portions cooperating in providing a vertical feed passageway between the cracking members, a rotary eccentrically mounted anvil operating directly under the passageway formed by the chord portions of the cracking members, said anvil having a concave portion extending throughout its length into which nuts fall from the passageway, and said anvil member rotating the nut resting thereon during cracking of the nut by the cracking members.

2. In a nut shelling machine, a housing having a feed opening, a pair of upper rotary parallel cracking members operating within the housing, said cracking members being eccentrically mounted, said cracking members having chord portions providing a passageway between the cracking members when the chord portions align during rotation of the cracking members, an anvil eccentrically mounted under the pair of cracking members and onto which nuts fall from said passageway, the axis of the anvil being in a vertical line drawn between the adjacent surfaces of the pair of cracking members above the anvil, the anvil having a concave portion in its periphery in which a cracked nut moves, portions of the periphery of the opposing cracking members providing nut cracking surfaces, and means for simultaneously rotating the cracking members and anvil, whereby a three-way pressure is directed to a nut resting on the anvil, uniformly cracking the shell of the nut and releasing the kernel thereof into the concave portion.

3. In a nut shelling machine, a rotating eccentrically mounted anvil having a concave portion in the periphery thereof, a pair of parallel opposed eccentrically mounted cracking members disposed above the anvil, said cracking members having chord portions aligning providing a feed passageway therebetween through which nuts fall onto the anvil, portions of the cracking members and anvil cooperating in pressing a nut resting on the anvil, cracking the shell of the nut as the cracking members and anvil rotate, and means for rotating the cracking members and anvil simultaneously.

ALBERT S. BLANKENSHIP.
FORREST F. BLANKENSHIP.

REFERENCES CITED

The following references are of record in the file of this patent:

UNITED STATES PATENTS

| Number | Name | Date |
|---|---|---|
| 11,401 | Ziegler | July 25, 1854 |
| 351,616 | Anderson | Oct. 26, 1886 |
| 484,258 | Sloan | Oct. 11, 1892 |
| 417,176 | France | June 15, 1910 |
| 1,187,878 | Williams | June 20, 1916 |
| 1,461,410 | Aldrich | July 10, 1923 |
| 1,709,018 | Howson | Apr. 16, 1929 |
| 2,144,841 | Glasser | Jan. 24, 1939 |
| 2,319,757 | Vigneau | May 18, 1943 |